No. 867,173. PATENTED SEPT. 24, 1907.
C. E. VAIL.
AUTOMATIC WEIGHING MACHINE.
APPLICATION FILED AUG. 30, 1906.

4 SHEETS—SHEET 1.

No. 867,173. PATENTED SEPT. 24, 1907.
C. E. VAIL.
AUTOMATIC WEIGHING MACHINE.
APPLICATION FILED AUG. 30, 1906.

4 SHEETS—SHEET 2.

Witnesses
C. L. Wright
H. Linehan

Inventor
C. E. Vail
By his Attorney
J. A. E. Criswell

No. 867,173. PATENTED SEPT. 24, 1907.
C. E. VAIL.
AUTOMATIC WEIGHING MACHINE.
APPLICATION FILED AUG. 30, 1906.
4 SHEETS—SHEET 3.
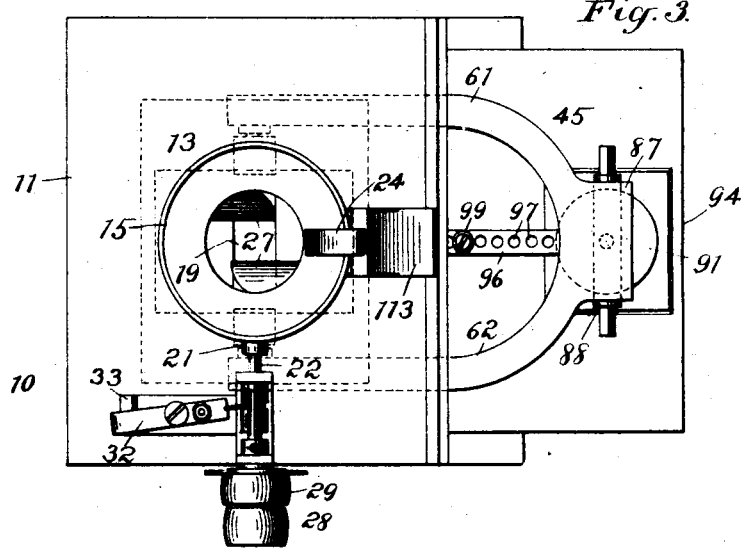
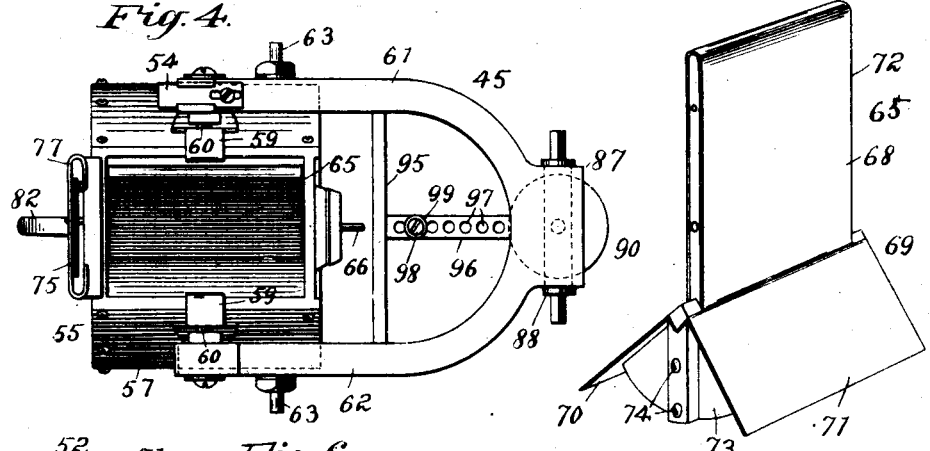
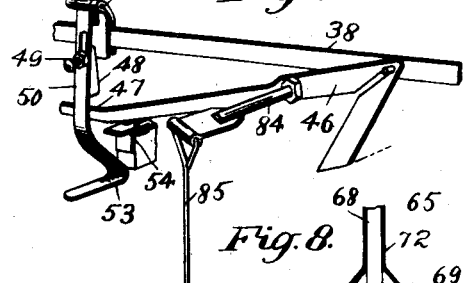
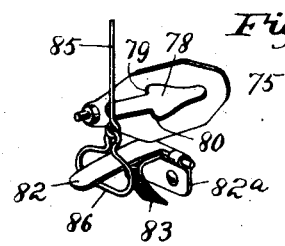

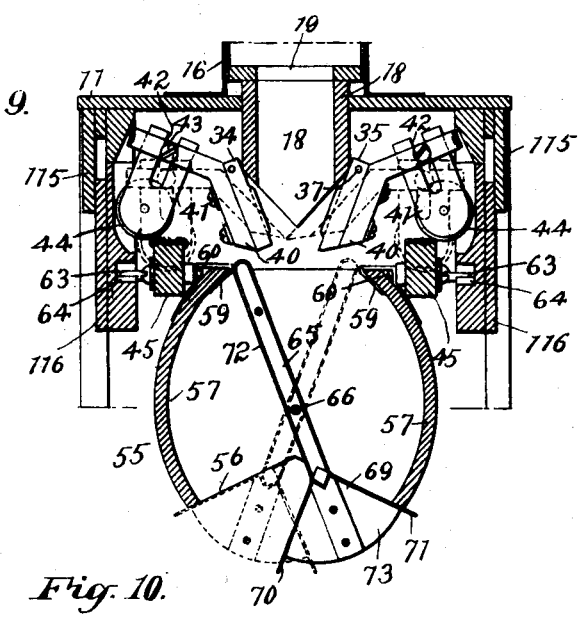

UNITED STATES PATENT OFFICE.

CHARLES E. VAIL, OF NEW YORK, N. Y.

AUTOMATIC WEIGHING-MACHINE.

No. 867,173.  Specification of Letters Patent.  Patented Sept. 24, 1907.

Application filed August 30, 1906. Serial No. 332,605.

*To all whom it may concern:*

Be it known that I, CHARLES E. VAIL, a citizen of the United States, and a resident of New York, county and State of New York, have invented certain new and useful Improvements in Automatic Weighing-Machines, of which the following is a full, clear, and exact description.

This invention relates more particularly to machines for automatically weighing various materials in large quantities.

The primary object of the invention is to provide simple and efficient means for automatically and accurately weighing various materials while in transit from a suitable source of supply, and to record the amount of material passing through and handled by the machine; which is simple in construction, and direct, rapid, and effective in operation, thereby saving time, labor and overweight; and which is not liable to get out of adjustment under the variable conditions to which such machines are subjected.

Further objects of the invention are to provide means adapted to handle and weigh either free flowing material, or material which is of a granular nature and such as will bind or hold fast together and not flow freely;
which has simple means for feeding and discharging the material; which will provide an initial and a final flow of the material and automatically shut off the supply thereof when the proper weight has been determined, and which will permit the material to be positively forced into the containing package.

A further object of the invention is to provide means whereby materials of different natures and specific gravity may be properly mixed, weighed, and discharged from the machine.

With these and other objects in view, the invention will be hereinafter more particularly described with reference to the accompanying drawings, which form a part of this specification, and will then be pointed out in the claims at the end of the description.

Figure 1:
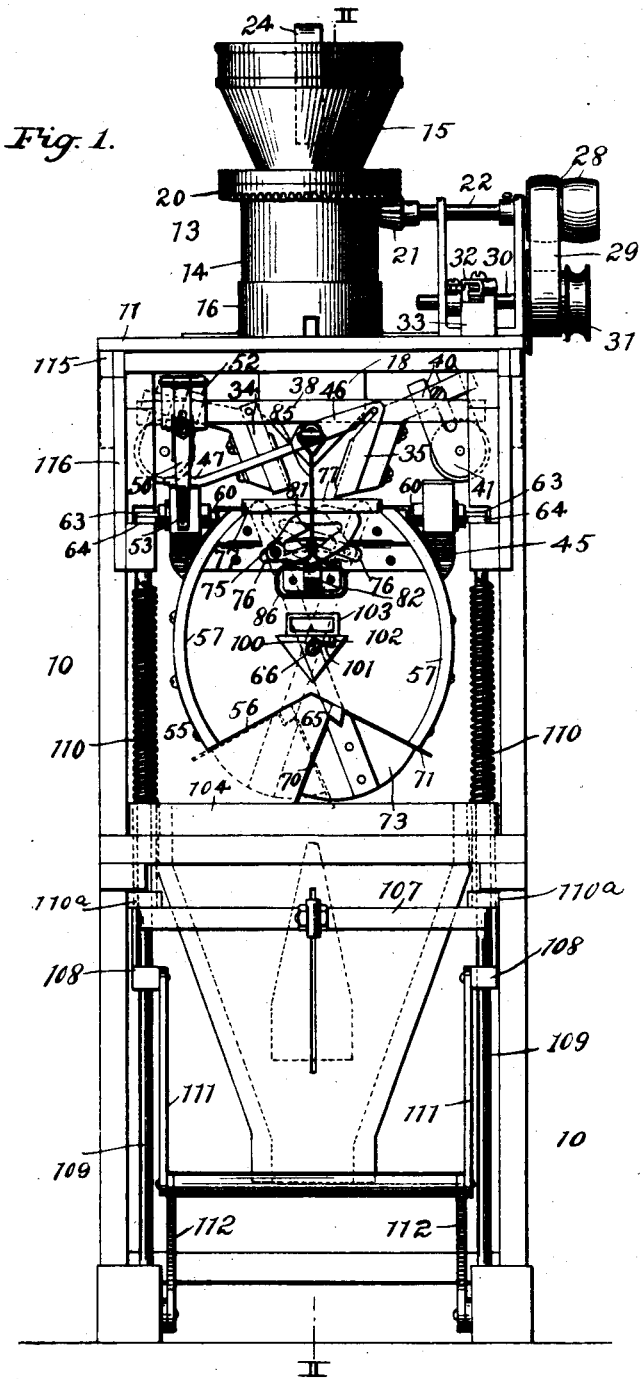
Figure 2:
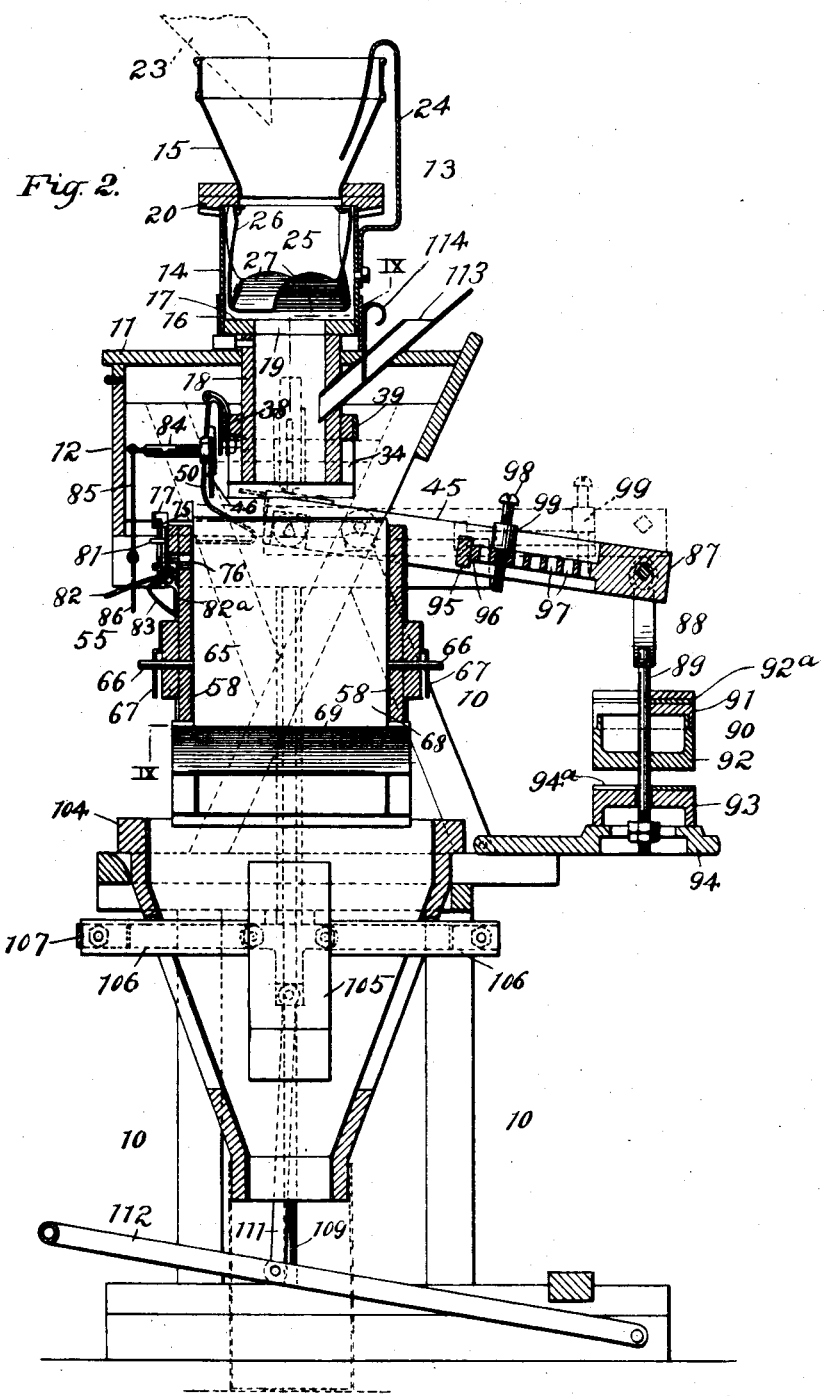

In the drawings, Figure 1 is a front elevation of one form of machine embodying my invention, the door at the upper part of the frame for inclosing the mechanism being removed. Fig. 2 is a vertical longitudinal section taken on the line II—II of Fig. 1. Fig. 3 is a plan view. Fig. 4 is a detail plan of the scale bucket or hopper and its supporting beam. Fig. 5 is a perspective view of the division gate of the scale bucket. Fig. 6 is a fragmentary perspective view of the mechanism for automatically closing one of the gates of the feed chute. Fig. 7 is a perspective view of the means for releasing the division gate of the scale bucket. Fig. 8 is a fragmentary view showing how the wings or plates of the division gate may be adjusted. Fig. 9 is a fragmentary vertical section of the upper part of the machine taken on the line IX—IX of Fig. 2. Fig. 10 is an inverted plan of the feed gates, and the housing therefor removed from the machine. Fig. 11 is a fragmentary elevation of the receiving hopper feeding means. Fig. 12 is a sectional plan taken on the line XII—XII of Fig. 11; and Fig. 13 is a side elevation of the upper part of the machine, showing how the receiving hopper and feeding means may be made readily removable.

The supporting frame 10 of the machine may be made of any suitable material, or constructed in any desired manner, and said frame may have a top 11 and a door 12 to inclose the upper part thereof. Above the top 11 is a receiving hopper 13, which comprises a stationary cylindrical member 14; and a rotary member 15. The member 14 has one end thereof fitting a recess in the lower end of the member 15 to rotatably hold the latter in position, and has its other end held in a fixed tube 16. This member 14 has a base 17 which fits over the upper edge of a feed chute 18, and in said base is an elongated or oblong slot 19, which communicates with the inlet of the feed chute. The member 15 flares outwardly at the top, and is provided at its lower edge with a bevel gear 20 which is in mesh with a smaller bevel gear 21. A suitably supported shaft 22 carries the gear 20 and when rotated imparts rotary motion to the member 15. The material is fed from any suitable source of supply, as by a chute shown in dotted lines at 23, and secured to the stationary member 14 is a plate or device 24, the upper end of which projects into the member 15 as shown in Fig. 1, and prevents the material holding to the sides of the hopper when the member 15 is rotated, thereby causing the material to pass into the member 14.

Where the material flows freely, as is the case with grains or like substances, the power-driven and rotary feeding device is unnecessary and may be disconnected; but where the material is granular or powdered and will pack or hold together, as flour, provision is made to assist in causing the material to pass into the chute 18. As shown, the member 15 of the receiving hopper carries a feeding device 25, for the purpose of separating and shoving the lower part of the material contained in the hopper through the opening 19 into the feed chute 18. This device has pendent arms 26 secured to the lower part of the member 15, and angularly arranged blades 27 which rotate above the opening 19. The inner edges of the blades 27 in one position, lie substantially parallel with the longer sides of the slot or opening 19, and as said blades rotate the material will be separated and carried or pushed by the blades into the opening 19 so as to enter the chute 18.

The member 15 of the hopper is rotated in any suitable way. As shown the shaft 22 has the usual fast and loose pulleys 28 around which the belt 29 is adapted to pass. This belt passes around a pulley fixed to the shaft 30, and on the latter shaft is a pulley 31, to which power may be communicated as desired. The shaft 30 is provided with sleeves or collars between which is adapted to move the ends of a lever 32. The lever 32 is pivoted to a support 33, and when moved on its pivot will throw the shaft 30 lengthwise in its bearings, and will thereby shift the belt 29 to throw the latter on to the fixed or the loose pulley for operating or stopping the machine as is the usual practice.

As a means to gage the speed of flow of the material properly, and to feed the exact quantity of material from the chute 18, the lower end of said chute is adapted to be closed by the feed gates or valves 34 and 35. The discharge end of the feed chute is made angular, and the angle thereof may be substantially forty-five degrees, the position of the feed gates when closed being at this same angle. The feed gates are pivoted at 37 between the transverse bars 38 and 39 adjacent to the feed chute. To each gate is secured an angular arm 40, and on each arm is a counterweight 41 tending normally to force its gate closed. The counterweights have each a slot 42, Figs. 1 and 9, and through said slot and arm 40 passes a bolt 43, by which said counterweight may be adjusted. A contact roller 44 is held in the end of each counterweight and forms a part thereof, and is adapted to engage the upper surface of the scale beam 45. The gates, through the rollers of the counterweights engaging the scale beam 45, will be opened or closed as the said beam is raised or lowered, and either gate may be made to remain inactive by adjusting the counterweight and roller so as to be out of the path of movement of said beam. By making the end of the chute angular and pivoting the gates to also lie at an angle, the material will flow readily from the chute when the gates are open.

The feed gate 35 has an arm 46 secured thereto, the end 47 of which is adapted to move in the path of a stop 48. This stop 48 has a bolt or screw 49 which passes through a slot in a trip 50, by which said stop 48 may be readily adjusted. The trip or device is pivoted at 51 to a bracket 52, Figs. 1 and 6, which is rigidly held to the transverse bar 38. The lower end 53 of the trip is bent at an angle, and is arranged in the path of movement of an adjustably held finger or projection 54 carried on one of the ends of the scale beam 45. It will be seen that as the feed gates close, the initial flow of the material will gradually reduce and the arm 46 will have its end 47 engaged by the stop 48. This will prevent the gate 35 from entirely closing, and will hold said gate stationary until the arm 46 is released by the projection 54 engaging the end 53 of the trip or device 50. As this takes place, the arm 46 will be released which will permit the counterweight on the gate 35 to quickly close said gate and thereby shut off the final flow of the material. The final flow may be regulated in this way to a stream most suitable for speed and accuracy, and the time of shut off determined by the release of the stop 48 from the end of arm 46.

To receive the material from the chute 18 when the gates 34 and 35 are open, is a scale bucket or hopper 55. This bucket has an inlet opening located beneath the chute 18, and is cut away at 56 to provide an angular discharge opening. The bucket has curved sides 57 and ends or heads 58, and to the upper edges of the sides are secured the brackets 59. Lugs or bolts 60 project from the scale beam and enter openings in the brackets 59 to pivotally hold and suspend the bracket, the said bolts being provided with knife edges to reduce friction. The scale beam is U-shaped and has two arms 61 and 62, and on each arm is a projection or knife-edge bolt 63 which rests in bearings 64 on the frame 10, and forms the fulcrum or pivot for said beam. A main division or scale gate 65, Figs. 2, 4 and 9, is pivoted between the heads of the bucket and is adapted to normally assume a tilted position and form compartments within said bucket on opposite sides of said division gate, only one of said compartments being adapted to receive the material at a time. This gate or member extends substantially the entire depth of the bucket and has its pivots 66 passing through the heads 58, and are journaled in brackets 67, the lower ends of which are separated from said heads. The division gate has a straight part or partition 68, and a valve part 69 carried thereby. The part 69 has two wings 70 and 71. These wings are at an angle with respect to the partition 68, and form a continuation of the plate 72, which latter forms a part of said partition. Between the wings 70 and 71 are plates 73, which have slots, Fig. 8, through which pass the bolts 74, by which the plates 73 may be adjusted and rigidly held to the partition 68. The adjustment of the plates 73 permits the angle of the blades or wings 70 and 71 to be changed to more readily and accurately fit the angle of the sides 56 forming the discharge opening of the bucket. As the material is discharged from the feed chute into the scale bucket, it will be deposited on either side of the partition 68 according to the position of said partition and valve. The material will rest upon one of the wings and between the partition and the inner side of the scale bucket, and until the division gate is released, as will be presently described, at which time the weight of the material resting upon the wing of the division gate, and assisted by the deflection caused by the curvature of the side of the bucket, will force the gate from the position shown in full lines in Fig. 9 to the position shown in dotted lines in said figure, ready to again receive the material from the feed chute. The material is thus fed alternately upon opposite sides of the division gate, and as each movement thereof will be very quick, the action will be such that any material adhering to the sides of the gate will be quickly dislodged and caused to pass from the bucket.

The division gate 65 of the scale bucket 55 is held against the action of the weight of the draft contained therein by a double-acting latch 75. This latch is pivoted to the upper end of the division gate and is movable bodily therewith. The latch has its pivot passing through a curved slot 76 in the head 58 of the scale bucket, and has its upper end free to slide between the head of said bucket and a guide bar 77 fastened thereto. The latch has an elongated slot 78 formed with two opposed recesses 79 and 80 which are adapted to alternately engage a pin or projection 81 located on the scale bucket. A lever 82 is pivoted to a bracket 82ª adjacent to the double-acting latch and normally engages the lower surface thereof, and has a finger 83 which engages the head of the bucket to retain the lever or arm 82 in position to engage said latch. As the lever 82 is moved, the latch will be lifted on its pivot so as to release the depressed portion 79 of the slot in the latch from the pin or projection 81, thus releasing the latch and permitting the load or draft within the bucket to quickly shift the division gate from the position shown in full lines to that of the dotted lines, or vice versa, according to the position of the gate and which compartment in the bucket contains the draft. By this action of the division gate the entire draft is quickly discharged from the bucket.

The lever 82 for releasing the double-acting latch may be moved on its pivot so as to be under the absolute control of the operator, or it may be operated automatically as shown. Here the arm 46 carried by the feed regulating gate 35 is provided with a projecting bolt 84, and connected with this bolt and pivotally held thereto is a rod or connection 85. To the end of the rod 85 is held a bail or loop 86 which fits over the end of the latch releasing lever 82, so that as the arm and feed gate finally closes, it will lift the lever 82, and release the double-acting latch 75, to permit the draft to be discharged and to shift the division gate 65, there being enough play in the bail or loop to permit the feed gate to practically close before the latch is released.

The scale bucket 55 and beam 45 has two movements while receiving the draft of material. To secure this the scale beam at its end 87 has a U-shaped yoke 88 pivoted to a knife edge support carried by said beam. To the yoke and slidingly held therein is a rod 89 which has a projection or pin to prevent disconnection, and fastened to said rod is a main weight 90. This weight may be in the form of a box, to permit shot or the like to be placed within the same, for the purpose of assisting in properly balancing the scale bucket and beam. The weight 90 has a slotted cover 91, which is readily removable from the rod 89 to permit the shot or smaller weights to be placed within the hollow base 92, and said cover is adapted to form a platform for the weights 92$^a$ employed to weigh the draft of material. A second weight 93 also forming a platform, is slidingly held on the rod 89, and on the end of said rod are adjustable nuts to fix the point at which the second weight will be taken up by the beam as the rod and weights are raised by the material in the bucket. The second weight 93 is adapted to rest on the table 94, which latter is pivoted to the machine frame, and said weight or platform 93 is adapted to support a second part 94$^a$ of the weight which is to weigh the material passing through the machine. The weights are thus divided into two divisions and act in succession on the beam as the bucket is lowered by the material fed thereto.

Two movements of the scale beam and bucket in their rise to a point of balance serve to avoid catch weights; and by minimizing the arc in which the beam travels, a gain of time and distance is obtained in releasing the feed gate 35 to shut off the final flow of the material, thus a corresponding reduction in the excess, which occurs in the material in transit between the time of balance and the time of shut off, is effected. The beam weights, against which the draft balances also affects the speed of the machine. For example, if in weighing a draft of one-hundred pounds, ninety-five pounds, as at 92$^a$, be placed on the upper weight or platform 91, and five pounds, as at 94$^a$, be placed on the lower weight 93, the speed of scale action is delayed by five pounds of reduced feed. When the material in the bucket raises the ninety-five pounds on the beam, the arm 46 on the feed gate 35 will be engaged by the stop 48 on the trip 50, and will reduce the feed to a finishing stream to permit a final and accurate cut off. The action of the beam places the projection 54 close to the lower end 53 of the trip 50, and when the balance of the total weight occurs, the trip 50 is operated and the gate 35 is quickly closed. The weights may be divided as the nature of the material handled requires, and when divided different variations of speed and accuracy of weights of the drafts are obtained.

It is necessary to compensate for the excess of material or that part of the draft which is in transit from the actual balancing of the bucket and the actual closing of the final feed of the material by the gates. For this purpose various means may be employed. As shown a bar 95 extends transversely between the arms of the scale beam 45, and secured between the bar and the end 87 of the scale beam, and at right angles to said bar, is a second bar 96. This second bar is provided with a series of apertures 97 in which the end of a bolt 98 of an auxiliary weight 99 fits, and by which said auxiliary weight may be adjusted to different distances from the fulcrum of said beam. In balancing the bucket in the first instance without the draft, the auxiliary weight is placed in the position shown on dotted lines in Fig. 2, and after the first draft or load has been weighed, and if the bucket with its draft should overbalance the scale-beam weights, the said auxiliary weight is moved toward the fulcrum, and until the bucket with its draft is brought to an exact balance. This will determine the proper weight of each succeeding draft or load before it is discharged from the scale bucket.

Each draft of material as it is weighed or discharged is properly recorded. For this purpose one of the pivots 66 of the division gate 65 is provided with an arm or crank 100, Fig. 1, and this crank is connected by a rod 101 to an arm 102 of a suitable recording device 103. The device 103 may be of the usual or of any preferred construction, and is adapted to be operated by the division gate as it is shifted in the scale bucket to discharge each draft, though other means than that shown may be employed to keep a register of the drafts.

The material discharged from the scale bucket or hopper may be conveyed in any suitable way to the point where it is desired, or the machine may be made to pack the material directly into the containing package. A hopper 104 is arranged immediately beneath the scale bucket or hopper 55 and may be removably held in the machine frame 10. This hopper is provided with converging sides and a lower open end around which the open end of the package to contain the material may fit as shown in dotted lines in Fig. 2, and said package, as a bag, may rest on a movable platform also shown on dotted lines, though the means for supporting the package as well as the kind of package may vary according to the material to be weighed. If the material is of such a nature as requires packing to place it in a package smaller than the natural bulk of the material, a plunger 105 may be arranged above the discharge outlet of the hopper 104, which is adapted to move vertically within said hopper. The plunger is so shaped and positioned that it does not materially interfere with the discharge from the bucket, and fastened to said plunger and projecting outwardly through slots therein are the arms 106. The arms are fastened to a frame 107 which surrounds the hopper, and fastened to said frame are cross-heads 108, which are slidingly held so as to move vertical on the rods 109. These rods are rigidly fastened to the machine frame 10, and around the rods are springs 110 which have one end fastened to the rods and the other ends held to move with the cross-heads and frame 107, said springs tending normally to force the cross-heads upward against buffers 110ª. A rod 11 is fastened at one end to each cross-head 108, and the other end is pivoted to a lever 112. These levers are pivoted to the machine frame, and are connected at the front end by a tube or other connection, and as said levers are forced downward, the cross-heads 108, frame 107, and plunger 105 will be likewise operated to force the material into the containing package. As soon as the levers 112 are released, the plunger will be restored to its former position by the springs 110 around the rods 109.

In some cases it is desirable to weigh a mixture of two materials of different natures, and of different specific gravity. The material requiring power to properly feed the same is fed into the hopper 13 as already described, and the free flowing material is adapted to be fed into a chute 113. This chute is arranged at an angle to feed chute 18, and has its lower end opening therein. A plate or valve 114 is arranged to regulate the flow of the material through the mixing chute, so that the proper amount of material flowing therethrough will enter and mix with the material in the chute 18. By this means two different materials may be quickly mixed, and such mixture pass through the machine, and properly weighed in any desired quantity.

The discharge-receiving hopper 104 may be removed from the machine frame 10 by disconnecting the mechanism for operating the plunger 105; and the scale, beam, and parts carried thereby may be also removed from the machine frame by lifting the beam upward, so as to remove the pivot bolts 63 from the bearings 64, which form the fulcrum of said beam, in order that the pivot bolts 63 may be withdrawn through the slots formed in the machine frame. The receiving hopper 13, feed chute 18, and feed gates 34 and 35, and their connecting parts are supported on the top 11. The top 11 has pendent sides 115, Figs. 9 and 13, which are cut away to engage the supporting beams or parts of the machine frame 10 and to span the sides 116 of said machine frame, thereby rigidly supporting the top 11 and parts carried by said top in such a way that said parts and top may be readily removable from the main part of the frame.

In operation, the auxiliary weight 99 of the scale beam 45 is placed in the position shown in dotted lines in Fig. 2, and the weights 90 and 93 are placed on the rod 89 carried by the scale beam as already described. These weights should be just sufficient to exactly balance the scale bucket, beam, and parts carried thereby. The weights 92 and 94ª for the draft are then placed upon the platforms of the weights 90 and 93 and the feed gates opened to feed the material into the scale bucket. As the scale bucket and beam lowers against the action of the weights, the feed gates will gradually close thereby forming an initial feed for the material. This will continue until the finger or projection 54 carried by one arm of the beam is close to the inclined portion 53 of the trip 50, the stop 48 of which, at this point, engages the arm 46 of the feed gate 35 and holds the same from further movement, the counterweight of the gate 34 having been so adjusted as to be entirely closed or put out of commission entirely as the case may be. The outer end of the beam as it rises by the weight of the draft in the bucket will be delayed by the second weight or division according to the amount of the same, and as soon as the weight of the material is sufficient to lift said second weight the finger 54 on the beam arm will release the trip 50 and the stop 48 from the end of the arm 46 of the feed gate 35, so that the counterweight carried thereby will close the same suddenly and stop the feed of the final flow. The draft with the excess, or material in transit, may overbalance the weights 90 and 93, in which case the auxiliary weight 99 will be moved toward the beam fulcrum or pivot, as shown in full lines, until the draft and weights exactly balance. This draft is then discharged by lifting the lever 82 and releasing the division gate 65. Each draft will now correspond exactly to the weights 92ª and 94ª, and if the machine is to discharge automatically the bail or loop 86 is placed in position to operate the lever 82 as the final flow or finishing stream is cut off. The material as it is discharged from the bucket will pass into the second hopper 104, and by the means already described, the plunger 105 may be caused to force the material into the containing package, or otherwise dispose of it as preferred.

From the foregoing it will be seen that simple and efficient means is provided whereby a succession of drafts may be automatically and accurately weighed and discharged from the machine, or each draft forced into a containing package, and that various materials separately or in combination may be handled in the same machine.

Having thus described my invention, I claim as new and desire to secure by Letters Patent:—

1. In an automatic weighing machine, the combination with a receiving hopper and a feed chute connected with said hopper, of gates adapted to close the lower end of said chute, adjustable devices carried by said gates, a scale bucket or hopper, a scale beam by which said bucket is pivotally held and which is adapted to engage the adjustable devices on the gates and fix the open position of the latter within the plane of movement of said beam, a movable division gate pivotally held within the scale bucket, means carried by the beam for balancing the scale bucket or hopper, together with means actuated by the movement of one of the feed gates for discharging the draft from the bucket.

2. In an automatic weighing machine, the combination with a feed chute for the material to be weighed, of gates adapted to close the lower end of said chute, devices carried by said gates, a scale bucket or hopper, a scale beam by which said bucket is pivotally held and which is adapted to engage the devices on the gates and fix the open position of the latter within the plane of movement of said beam, a movable division gate pivotally held within the scale bucket, means carried by the beam for balancing the scale bucket, together with means actuated by the movement of one of the feed gates for discharging the draft from said bucket.

3. In an automatic weighing machine, the combination with a receiving hopper, of pivoted feed gates adapted to regulate the flow of material from said hopper, devices carried by said gates adapted to move the latter against the flow of the material, a scale bucket, a scale beam by which said bucket is held and which is adapted to engage the devices on the gates and fix the open position of the latter within the plane of movement of said scale beam, a movable division gate held within the scale bucket, means carried by the beam for balancing the scale bucket or hopper, together with means actuated by the movement of one of the feed gates for discharging the draft from the bucket.

4. The combination with a scale bucket, means for weighing the draft contained in said bucket, of a receiving hopper having an elongated slot in the bottom thereof, means for controlling the flow of material from said hopper to the scale bucket, a rotary member having a blade movable within said hopper, the lower end of which is angularly disposed and which separates the material and causes the same to pass to the feed regulating means, and means for rotating the blade.

5. The combination with a receiving hopper, of a feed chute connected with said hopper, a pivoted gate adapted to close the lower end of said chute, a device carried by said gate and normally tending to force the latter shut, a scale bucket or hopper, a scale beam by which said bucket is pivotally held and which is adapted to engage the device on the gate and thereby determine the open position of the gate within the plane of movement of the beam, a movable division gate pivotally held within the scale bucket, means carried by the beam for balancing the scale bucket or hopper, together with means actuated by the movement of the feed gate for discharging the successive drafts or loads from the bucket.

6. The combination with means for holding material to be weighed, of means adapted to shut off the flow of the material, a scale hopper or bucket, a pivotally held scale beam from which the bucket is suspended, devices between the scale beam and the means shutting off the flow of the material and independent of the beam whereby the position of the latter may be partly regulated by the position of and finally released by said beam, a movable division gate pivotally held within the scale bucket, means for holding the division gate to retain a draft of material within the bucket, means for balancing the bucket, together with means for releasing the movable division gate.

7. The combination with a scale hopper or receptacle, and means for suspending the same, of means for supplying the material to said bucket, a division gate movable within the bucket, a double-acting latch movable with the division gate and having a slot with depressions therein, a pin projecting from the bucket and adapted to successively engage the depressions of the latch, and means for releasing the latch from the pin to permit the discharge of the load.

8. The combination with a scale hopper or receptacle, and means for suspending the same, of means for supplying the material to said bucket, a pivotally held division gate movable within the bucket and extending substantially the entire depth thereof, a double-acting latch movable with the division gate and having a slot with depressions, a pin projecting from the bucket and entering the slot and adapted to successively engage the depressions, and means for releasing the latch to discharge the load.

9. In a weighing machine, the combination with material feeding means, of a scale bucket or hopper, a scale beam by which the said bucket is held, weights for balancing said bucket and beam, an auxiliary weight compensating for the excess of material or that which is in transit between the time of shutting off the flow and the weighing of the material, a bar having apertures therein carried by the scale beam and a projection on the auxiliary weight adapted to fit the apertures whereby said latter weight may be made adjustable.

10. The combination with a scale bucket having an inlet and a discharge opening, of means for feeding the material, a division gate pivotally held within the bucket and adapted to form compartments and sustain a draft within said bucket, a double-acting latch movable with the gate and adapted to hold and lock the same when shifted on its pivot, and means for releasing the latch to permit the draft acting on the division gate to shift its position and discharge the draft after the feed is shut off.

11. The combination with a scale bucket or hopper having an inlet and a discharge opening, of means for feeding the material, a division gate movable within the bucket, a double-acting latch movable with the gate and adapted to hold and lock the same when shifted on its pivot, and means for releasing the latch to permit the draft acting on the division gate to shift its position and discharge the draft after the feed is shut off.

12. The combination with a scale bucket or hopper having an inlet and a discharge opening, of a division gate pivotally held within the bucket and adapted to form compartments and sustain a draft within said bucket, a fixed projection on the bucket, a double-acting latch pivoted to the gate and having portions engaging the fixed projection to hold and lock the gate when shifted on its pivot, and means for releasing the latch to permit the draft acting on the division gate to shift its position.

13. The combination with means for supplying material to be weighed, of a vertically swinging gate adapted to regulate the flow of the material, a horizontally extending arm carried by said gate, a pivoted trip or catch extending downward and arranged within the path of movement of said arm, an adjustable stop carried by the trip and adapted to engage the arm carried by the feed gate, a scale bucket, a division gate extending substantially the entire depth of the bucket and dividing the latter into two compartments, means movable with the scale bucket adapted to release the stop from the arm to permit the feed gate to close suddenly, and means operated during the movement of the feed gate to release the division gate to discharge the load.

14. The combination with means for supplying material to be weighed, of a vertically swinging gate adapted to regulate the flow of the material, a horizontally extending arm carried by said gate, a pivoted trip or catch extending downward and arranged within the path of movement of said arm, an adjustable stop carried by the trip and adapted to engage the arm carried by the feed gate, a scale bucket, a division gate held within the bucket and dividing the latter into two compartments, means movable with the scale bucket adapted to release the stop from the arm to permit the feed gate to close suddenly, and means operated during the movement of the feed gate to release the division gate to discharge the load.

15. The combination with means for supplying material to be weighed, a vertically swinging gate adapted to regulate the flow of the material, a horizontally extending arm carried by the gate, a pivoted trip or catch extending downward and arranged within the path of movement of said arm, an adjustable stop carried by the trip and adapted to engage the arm carried by the feed gate, a scale bucket, a pivotally held division gate extending substantially the entire depth of the bucket and dividing the latter into two compartments, means movable with the scale bucket adapted to release the stop from the arm to permit the feed gate to close suddenly, and means operated during the movement of the feed gate to release the division gate to discharge the load.

16. The combination with means for holding the material to be weighed, of a gate adapted to regulate the flow of material, an arm carried by said gate, a pivoted trip or catch, an adjustable stop carried by the trip and adapted to engage the arm carried by the feed gate, a scale bucket, a pivoted beam carrying the bucket, and a projection on the beam adapted to release the stop from the arm to permit the feed gate to close suddenly.

17. The combination with means for holding the material to be weighed, of a gate adapted to regulate the flow of material, an arm carried by said gate, a pivoted trip or catch, a stop carried by the trip and adapted to engage the arm carried by the feed gate, a scale bucket, and means movable with the scale bucket adapted to release the stop from the arm to permit the feed gate to close suddenly, a division gate pivotally held within the bucket, means for locking the division in a position to form compartments within the bucket, and means carried by the feed gate arm adapted to release the means holding the division gate during the closing of the feed gate to permit the discharge of the draft of material from said bucket.

18. The combination with a scale bucket and means for weighing the draft contained in said bucket, of a receiving hopper, means for controlling the flow of material from said hopper to the scale bucket, a rotary member forming a part of said hopper, blades pendent from said rotary member and having angularly disposed blades for separating the material and causing the same to pass to the feed regulating means, and means for positively rotating the blades.

19. The combination with a scale bucket, and means for weighing the draft contained in said bucket, of a receiving hopper, means for controlling the flow of material from said hopper to the scale bucket, a rotary member forming a part of said hopper, two blades movable with said rotary member and having angularly disposed blades for separating the material and causing the same to pass to the feed regulating means, and means for rotating the blades.

20. The combination with a scale bucket, and means for weighing the draft contained in said bucket, of a receiving hopper, means for controlling the flow of material from said hopper to the scale bucket, a rotary member forming a part of said hopper, blades carried by said member and having angularly disposed blades for separating the material and causing the same to pass to the feed regulating means, means for rotating the blades, together with a chute for conveying a different class of material to mix with the material from the hopper.

21. In a weighing machine, the combination with a scale bucket, of means for feeding material to said bucket, a hopper located directly beneath the scale bucket, means for discharging the draft of material from the bucket to said hopper, and a plunger movable in the hopper directly under the bucket and adapted to force the material discharged from the bucket from said hopper.

22. In a weighing machine, the combination with a receiving hopper, of a scale bucket, means for regulating the flow of material to said bucket from the hopper, a second or draft-receiving hopper, means for discharging the draft of material from the bucket to said latter hopper, a plunger movable in the draft receiving hopper directly under the scale bucket and adapted to force the material discharged from the bucket from said hopper, and means for operating the plunger.

CHARLES E. VAIL.

Witnesses:
M. TURNER,
H. LINEHAN.